(12) United States Patent
Brett et al.

(10) Patent No.: US 11,663,375 B2
(45) Date of Patent: May 30, 2023

(54) CONFIGURATION OF A DIGITAL TWIN FOR A BUILDING OR OTHER FACILITY VIA BIM DATA EXTRACTION AND ASSET REGISTER MAPPING

(71) Applicant: Willow Technology Corporation Pty Ltd, Sydney (AU)

(72) Inventors: Dale Brett, Sydney (AU); Rani Adam, Sydney (AU)

( * ) Notice: Subject to any disclaimer, the term of this patent is extended or adjusted under 35 U.S.C. 154(b) by 447 days.

(21) Appl. No.: 16/560,596

(22) Filed: Sep. 4, 2019

(65) Prior Publication Data
US 2020/0387576 A1    Dec. 10, 2020

(30) Foreign Application Priority Data

May 3, 2019  (AU) ................................ 2019901507
May 3, 2019  (AU) ................................ 2019901517

(51) Int. Cl.
*G06F 30/13* (2020.01)
*G06F 3/04815* (2022.01)
*G06F 111/02* (2020.01)

(52) U.S. Cl.
CPC .......... *G06F 30/13* (2020.01); *G06F 3/04815* (2013.01); *G06F 2111/02* (2020.01)

(58) Field of Classification Search
CPC .. G06F 30/13; G06F 3/04815; G06F 2111/02; G06F 16/29; G06F 16/2255; G06F 21/568; G06T 17/00; G06T 2210/04; G06T 2210/56; G06Q 50/163; G06Q 10/0637; G06Q 10/06313; G06Q 30/018;
(Continued)

(56) References Cited

U.S. PATENT DOCUMENTS

| | | | |
|---|---|---|---|
| 8,201,257 B1 * | 6/2012 | Andres | G06F 21/568 |
| | | | 726/25 |
| 10,733,775 B1 * | 8/2020 | Chu | G06F 30/13 |
| 2008/0059220 A1 * | 3/2008 | Roth | G06Q 30/018 |
| | | | 705/311 |

(Continued)

FOREIGN PATENT DOCUMENTS

| | | | | |
|---|---|---|---|---|
| CA | 2979202 C | | 8/2019 | |
| CN | 107341209 A | * | 11/2017 | ........ G06F 16/24522 |

(Continued)

OTHER PUBLICATIONS

US-20200304375-A1 short version Sep. 2020.*

(Continued)

*Primary Examiner* — Kandasamy Thangavelu
(74) *Attorney, Agent, or Firm* — Cozen O'Connor

(57) ABSTRACT

The present disclosure provides, in various embodiments, technology for configuration of a digital twin for a building or other facility via BIM (Building Information Modelling) data extraction and asset register mapping. This is particularly relevant for the purposes of increasing efficiency and reducing risks of data errors in the context of configuring a digital twin interface for a building. Also described herein is technology configured to provide data flow management for defining of digital records representing building infrastructure based on building information modelling data. This is particularly relevant for the purposes of increasing efficiency and reducing risks of data errors in the context of configuring a digital twin interface for a building.

10 Claims, 9 Drawing Sheets

(58) Field of Classification Search
CPC ........... F24F 11/63; F24F 11/30; H04L 41/12; H04W 64/003
See application file for complete search history.

(56) References Cited

U.S. PATENT DOCUMENTS

| | | | | |
|---|---|---|---|---|
| 2011/0307281 | A1* | 12/2011 | Creveling | G06F 30/13 705/7.11 |
| 2013/0338972 | A1* | 12/2013 | Chao | G06Q 10/0637 703/1 |
| 2017/0230930 | A1* | 8/2017 | Frey | H04W 64/003 |
| 2018/0364654 | A1* | 12/2018 | Locke | F24F 11/63 |
| 2019/0095644 | A1* | 3/2019 | Park | G06F 16/2255 |
| 2019/0095865 | A1* | 3/2019 | McCally | G06Q 10/06313 |
| 2019/0158309 | A1* | 5/2019 | Park | H04L 12/2827 |
| 2019/0353378 | A1* | 11/2019 | Ramamurti | F24F 11/30 |
| 2020/0304375 | A1* | 9/2020 | Chennai | H04L 41/12 |

FOREIGN PATENT DOCUMENTS

| | | | | |
|---|---|---|---|---|
| CN | 108897969 A | * | 11/2018 | G06F 30/13 |
| CN | 109598997 A | * | 4/2019 | G06T 19/00 |
| KR | 20180121193 A | * | 11/2018 | G06F 17/30569 |
| WO | WO 2004017231 A1 | * | 2/2004 | G06F 17/30 |
| WO | WO 2015132691 A2 | * | 9/2015 | G06F 17/50 |
| WO | WO 2019067645 A1 | * | 4/2019 | G08B 25/14 |

OTHER PUBLICATIONS

US-20190095644-A1 short version Mar. 2019.*
US-20170230930-A1 short version Aug. 2017.*
US-20180364654-A1 short version Dec. 2018.*
US-20130338972-A1 short version Dec. 2013.*
US-20190353378-A1 short version Nov. 2019.*
US-8201257-B1 short version Jun. 2012.*
US-20190095865-A1 short version Mar. 2019.*
US-10733775-B1 Au short version Aug. 2020.*
US-20080059220-A1short version Mar. 2008.*
US-20190158309-A1 short version May 2019.*
US-20110307281-A1 short version Dec. 2011.*
"Convert a 3D Revit model to 3D AutoCAD", Hurrican Batch Processor Review, Sep. 2015.*

* cited by examiner

| Air Handling Unit (AHU) | | | | | | | | | |
|---|---|---|---|---|---|---|---|---|---|
| NEW RECORD | IMPORT | | OPTIONS | | Search by name | | | | |

| ACTIONS | NAME | FLOOR CODE | TYPE | ASSET IDENTIFIER | SYSTEM | SPECIFICATION SECTION | CATEGORY | LOCATION | MANUFACTURER |
|---|---|---|---|---|---|---|---|---|---|
| △ ⊘ ☐ | Air Handling Unit | L08 | Air Handling Unit | M-AHU-LR-W | Air Distribution | M-SP-01 | Mechanical | Plantroom | |
| △ ⊘ ☐ | Air Handling Unit | L08 | Air Handling Unit | M-AHU-LR-N | Air Distribution | | Mechanical | Plantroom | |
| △ ⊘ ☐ | Air Handling Unit | L08 | Air Handling Unit | M-AHU-LR-E | Air Distribution | | Mechanical | Plantroom | |
| △ ⊘ ☐ | Air Handling Unit | L08 | Air Handling Unit | M-AHU-LR-CW | Air Distribution | | Mechanical | Plantroom | |
| △ ⊘ ☐ | Air Handling Unit | L08 | Air Handling Unit | M-AHU-LR-CE | Air Distribution | M-SP-01 | Mechanical | Plantroom | |
| △ ⊘ ☐ | Air Handling Unit | L08 | Air Handling Unit | M-AHU-LR-W | Air Distribution | M-SP-01 | Mechanical | Plantroom | |

CONFIGURATION OF A DIGITAL TWIN FOR A BUILDING OR OTHER FACILITY VIA BIM DATA EXTRACTION AND ASSET REGISTER MAPPING

FIELD OF THE INVENTION

The present invention relates, in various embodiments, to technology for configuration of a digital twin for a building or other facility via BIM (Building Information Modelling) data extraction and asset register mapping. Other embodiments relate to technology configured to provide data flow management for defining of digital records representing building infrastructure based on building information modelling data. While some embodiments will be described herein with particular reference to those applications, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Modern buildings have a wide range of connected devices, for example devices managed via a Building Management System (BMS), and other Internet of Things (IOT) devices. Configuration of a user interface that provides convenient access to those devices across building in a logical manner is a complex and error-prone task. For example, it typically requires identification of all devices in a building, and individual mapping of those to particular locations defined in a control interface.

Building Information Modelling (BIM) technology is widely used for the purposes of building design, allowing collaboration over building design, for example in the context of enabling users to add and information objects representing building components to architectural diagrams. However there are often technical challenges associated in leveraging models created through such software for purposes beyond the design phase of a building.

SUMMARY OF THE INVENTION

It is an object of the present invention to overcome or ameliorate at least one of the disadvantages of the prior art, or to provide a useful alternative.

One embodiment provides a method for configuration of a digital twin for a building, the method including:

identifying one or more BIM model files for the building, wherein the BIM model files each include data sets representative of respective physical networked assets that are to be installed in the building, wherein each of the data sets has a unique identifier (UID);

as a first process:

extracting the data sets from the one or more BIM model files thereby to populate an asset register, such that the asset register includes an asset record for each of the networked physical assets, wherein each asset records includes the respective UID from the BIM model file;

providing an interface that enables updating of the asset register during construction of the building and physical installation/configuration of the networked physical assets, such that each of the asset records includes a data field populated to contain information that enables access to data and/or a control interface for the represented physical networked asset;

as a second process:

performing a conversion of at least subset of the one or more BIM model files for the building thereby to define one or more visualisation files for the building, wherein the visualisation files:

(i) are configured to be rendered via a 3D navigation interface presented at a client terminal thereby to enable a user of that client terminal to navigate and view a 3D visualisation of the building; and (ii) include data points that are positioned at locations in the 3D visualisation associated with the networked physical assets, and respectively configured to cause displaying of obtained data based on the respective UID from the BIM model file;

operating a data mapping module that is configured to facilitate the displaying of the obtained data by a process including:

(i) identifying an asset UID provided from the visualisation file;

(ii) determining, from the asset register, the value for the data field populated to contain information that enables access to data and/or a control interface for the represented physical networked asset;

(iii) causing mapping of data and/or control interface for the represented physical networked asset to the 3D navigation interface;

such that data is automatically mapped from the physical networked assets to the 3D visualisation interface.

One embodiment provides a method wherein the data field populated to contain information that enables access to data and/or a control interface for the represented physical networked assets includes a BACnet identifier defined in respect of a BACnet that is configured for the building.

One embodiment provides a method wherein the data field populated to contain information that enables access to data and/or a control interface for the represented physical networked asset includes a BACnet address.

One embodiment provides a method wherein the data field populated to contain information that enables access to data and/or a control interface for the represented physical networked asset includes a network location.

One embodiment provides a method wherein the data field populated to contain information that enables access to data and/or a control interface for the represented physical networked asset includes a hyperlink.

One embodiment provides a method wherein extracting the data sets from the one or more BIM model files thereby to populate an asset register includes operating a BIM model data input module, wherein the BIM model data input module is configured to communicate with a plurality of instances of a model data extraction module that execute at respective remote client systems, wherein:

(i) an operator of a given one of the remote client systems triggers execution of a model data extraction process;

(ii) the model data extraction module is selectively granted access to transmit data to the BIM data input module, based on a user verification and permission determination process; and (iii) the model data extraction module performs a data analysis process in respect of a defined BIM model file thereby to extract a plurality of data sets complying with a predefined metadata schema;

(iv) the model data extraction module causes transmission of the extracted data sets to the BIM data input module; and (v) for each of the extracted data sets, the BIM data input module determines an asset type, creates a new asset record in the asset register having predefined set of data fields associated with that asset type, and pre-populates a subset of those data fields with data values in the extracted data set based on a predefined metadata schema;

One embodiment provides a method wherein providing an interface that enables updating of the asset register during construction of the building and physical installation/configuration of the networked physical assets, such that each of the asset records includes a data field populated to contain information that enables access to data and/or a control interface for the represented physical networked asset, includes operating an asset data input module that is configured to enable a user of a remote client terminal, responsive to permissions maintained by the permissions management module, to add data values to data fields for a subset of the records in the asset register database;

One embodiment provides a method wherein the BIM model files include Autodesk Revit files.

One embodiment provides a method wherein performing a conversion of at least subset of the one or more BIM model files for the building thereby to define one or more visualisation files includes performing a conversion from Autodesk Revit into AutoCad, and performing editing of a visualisation file using AutoCad.

One embodiment provides a method wherein the mapping from the physical networked assets to the 3D visualisation interface causes, for a given asset, displaying live data streamed onto the network by the physical asset via the 3D visualisation interface.

One embodiment provides a method including performing a scope-of-responsibility permissions assessment thereby to determine, for a given user of the 3D visualisation interface, a subset of assets defined in the asset register that the user is permitted to access.

One embodiment provides a method system configured to provide a digital twin interface for a building, wherein mapping between a 3D visualisation interface and data provided by physical networked assets in the building is achieved via a method including:

identifying one or more BIM model files for the building, wherein the BIM model files each include data sets representative of respective physical networked assets that are to be installed in the building, wherein each of the data sets has a unique identifier (UID);

as a first process:

extracting the data sets from the one or more BIM model files thereby to populate an asset register, such that the asset register includes an asset record for each of the networked physical assets, wherein each asset records includes the respective UID from the BIM model file;

providing an interface that enables updating of the asset register during construction of the building and physical installation/configuration of the networked physical assets, such that each of the asset records includes a data field populated to contain information that enables access to data and/or a control interface for the represented physical networked asset;

as a second process:

performing a conversion of at least subset of the one or more BIM model files for the building thereby to define one or more visualisation files for the building, wherein the visualisation files:

(i) are configured to be rendered via a 3D navigation interface presented at a client terminal thereby to enable a user of that client terminal to navigate and view a 3D visualisation of the building; and (ii) include data points that are positioned at locations in the 3D visualisation associated with the networked physical assets, and respectively configured to cause displaying of obtained data based on the respective UID from the BIM model file;

operating a data mapping module that is configured to facilitate the displaying of the obtained data by a process including:

(i) identifying an asset UID provided from the visualisation file;

(ii) determining, from the asset register, the value for the data field populated to contain information that enables access to data and/or a control interface for the represented physical networked asset;

(iii) causing mapping of data and/or control interface for the represented physical networked asset to the 3D navigation interface;

such that data is automatically mapped from the physical networked assets to the 3D visualisation interface.

One embodiment provides a system configured to enable workflow management in building construction, the system including:

an asset register database, wherein the asset register database is configured to maintain a plurality of asset records associated with a common building project, wherein each asset record has an asset type, and is configured to contain a predefined set of data fields associated with that asset type that are able to be populated with respective data values;

a permissions management module, wherein the permissions management module is configured to maintain data respective of access permissions for a plurality of users;

a BIM model data input module, wherein the BIM model data input module is configured to communicate with a plurality of instances of a model data extraction module that execute at respective remote client systems, wherein:

(i) an operator of a given one of the remote client systems triggers execution of a model data extraction process;

(ii) the model data extraction module is selectively granted access to transmit data to the BIM data input module, based on a user verification and permission determination process performed by the permissions management module; and (iii) the model data extraction module performs a data analysis process in respect of a defined BIM model file thereby to extract a plurality of data sets complying with a predefined metadata schema;

(iv) the model data extraction module causes transmission of the extracted data sets to the BIM data input module; and (v) for each of the extracted data sets, the BIM data input module determines an asset type, creates a new asset record in the asset register database having predefined set of data fields associated with that asset type, and pre-populates a subset of those data fields with data values in the extracted data set based on the predefined metadata schema;

such that the BIM data input module creates new asset records in the asset register database, for a common building project, based on data contained in a plurality of discrete BIM model files maintained on respective host systems;

an asset data input module that is configured to enable a user of a remote client terminal, responsive to permissions maintained by the permissions management module, to add data values to data fields for a subset of the records in the asset register database;

a rules module that is configured to maintain, for each asset type, one or more rules for determining a record completion compliance measure; and a compliance monitoring module that is configured to, responsive to the rules module, determine and enable output of data representative of record completion compliance measures for the asset records in the asset register database.

One embodiment provides a system wherein the predefined set of data fields associated with a given asset type are selected based upon a COBie protocol.

One embodiment provides a system wherein the BIM model file is a Revit file.

One embodiment provides a system wherein the model data extraction module executes as a plugin from within a software environment configured to access the Revit file.

One embodiment provides a system wherein for a subset of the asset types, the predefined set of data fields include a field that is designated to be populated with a data value that enables accessing of live asset data from a physical networked device that physically embodies a specific asset represented by a given asset record.

One embodiment provides a system wherein the data value that enables accessing of live asset data from the physical networked device enables identification of the physical device on a BACnet network.

One embodiment provides a system wherein the data value that enables accessing of live asset data from the physical networked device enables mapping of live asset data from a physical asset to a digital twin interface.

One embodiment provides a system wherein the digital twin interface is configured to access live data for a plurality of connected physical assets in the building based on mapping of data provided by the asset register database.

One embodiment provides a system wherein the compliance monitoring module is configured to provide output data representative of a number of compliant physical assets against a number of compliant physical assets.

One embodiment provides a system wherein access to asset records via the asset data input module is based on scope-of-responsibility based permissions defined via the permissions management module.

One embodiment provides a system wherein, for at least a subset of the asset types, the predefined set of data fields associated with that asset type that are able to be populated with respective data values include one or more data fields representative of a state of asset installation.

One embodiment provides a system wherein, for at least a subset of the asset types, the predefined set of data fields associated with that asset type that are able to be populated with respective data values include one or more data fields representative of a state of asset commissioning.

One embodiment provides a system wherein, for at least a subset of the asset types, the predefined set of data fields associated with that asset type that are able to be populated with respective data values include one or more data fields representative of a state of asset testing.

One embodiment provides a system wherein the plurality of data sets complying with a predefined metadata schema extracted by the data analysis process performed by the model data extraction module each include a respective UID defined by a software application used to generate the BIM model file.

One embodiment provides a system wherein, for each of the extracted data sets, the BIM data input module combines the UID with an asset name data value defined in that data set thereby to define an asset register UID for the asset register database.

One embodiment provides a system wherein a data validation module is configured to validate that each asset has an asset register UID that is unique in the asset register database.

One embodiment provides a method configured to enable workflow management in building construction, the method including:

maintaining an asset register database, wherein the asset register database is configured to maintain a plurality of asset records associated with a common building project, wherein each asset record has an asset type, and is configured to contain a predefined set of data fields associated with that asset type that are able to be populated with respective data values;

maintaining a permissions management module, wherein the permissions management module is configured to maintain data respective of access permissions for a plurality of users;

operating a BIM model data input module, wherein the BIM model data input module is configured to communicate with a plurality of instances of a model data extraction module that execute at respective remote client systems, wherein:

(i) an operator of a given one of the remote client systems triggers execution of a model data extraction process;

(ii) the model data extraction module is selectively granted access to transmit data to the BIM data input module, based on a user verification and permission determination process performed by the permissions management module; and (iii) the model data extraction module performs a data analysis process in respect of a defined BIM model file thereby to extract a plurality of data sets complying with a predefined metadata schema;

(iv) the model data extraction module causes transmission of the extracted data sets to the BIM data input module; and (v) for each of the extracted data sets, the BIM data input module determines an asset type, creates a new asset record in the asset register database having predefined set of data fields associated with that asset type, and pre-populates a subset of those data fields with data values in the extracted data set based on the predefined metadata schema;

such that the BIM data input module creates new asset records in the asset register database, for a common building project, based on data contained in a plurality of discrete BIM model files maintained on respective host systems;

enabling a user of a remote client terminal, responsive to permissions maintained by the permissions management module, to add data values to data fields for a subset of the records in the asset register database;

responsive to a rules module that is configured to maintain, for each asset type, one or more rules for determining a record completion compliance measure, determining and enable output of data representative of record completion compliance measures for the asset records in the asset register database.

One embodiment provides a method configured to enable workflow management in building construction, the method including:

a plurality of design users generating respective BIM model files;

performing a federated validation of the respective BIM model files thereby to validate cross-compatibility;

providing each of the design users with access to operate a model data extraction module thereby to perform a data analysis process in respect of their respective model file thereby to extract a plurality of data sets complying with a predefined metadata schema and push that data to an asset register database based on a predefined metadata schema, One embodiment provides a method configured providing a set of asset installation users with access to an asset data to a BIM data input module thereby to update data values associated with a subset of records in the register database based on scope of responsibility permissions.

One embodiment provides a method including executing a process thereby to determine compliance of each of the records in the asset register.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

The description below refers to "systems" and "modules". The term "module" refers to a software component that is logically separable (a computer program), or a hardware component. The module of the embodiment refers to not only a module in the computer program but also a module in a hardware configuration. The discussion of the embodiment also serves as the discussion of computer programs for causing the modules to function (including a program that causes a computer to execute each step, a program that causes the computer to function as means, and a program that causes the computer to implement each function), and as the discussion of a system and a method. For convenience of explanation, the phrases "stores information," "causes information to be stored," and other phrases equivalent thereto are used. If the embodiment is a computer program, these phrases are intended to express "causes a memory device to store information" or "controls a memory device to cause the memory device to store information." The modules may correspond to the functions in a one-to-one correspondence. In a software implementation, one module may form one program or multiple modules may form one program. One module may form multiple programs. Multiple modules may be executed by a single computer. A single module may be executed by multiple computers in a distributed environment or a parallel environment. One module may include another module. In the discussion that follows, the term "connection" refers to not only a physical connection but also a logical connection (such as an exchange of data, instructions, and data reference relationship). The term "predetermined" means that something is decided in advance of a process of interest. The term "predetermined" is thus intended to refer to something that is decided in advance of a process of interest in the embodiment. Even after a process in the embodiment has started, the term "predetermined" refers to something that is decided in advance of a process of interest depending on a condition or a status of the embodiment at the present point of time or depending on a condition or status heretofore continuing down to the present point of time. If "predetermined values" are plural, the predetermined values may be different from each other, or two or more of the predetermined values (including all the values) may be equal to each other. A statement that "if A, B is to be performed" is intended to mean "that it is determined whether something is A, and that if something is determined as A, an action B is to be carried out". The statement becomes meaningless if the determination as to whether something is A is not performed.

The term "system" refers to an arrangement where multiple computers, hardware configurations, and devices are interconnected via a communication network (including a one-to-one communication connection). The term "system", and the term "device", also refer to an arrangement that includes a single computer, a hardware configuration, and a device. The system does not include a social system that is a social "arrangement" formulated by humans.

At each process performed by a module, or at one of the processes performed by a module, information as a process target is read from a memory device, the information is then processed, and the process results are written onto the memory device. A description related to the reading of the information from the memory device prior to the process and the writing of the processed information onto the memory device subsequent to the process may be omitted as appropriate. The memory devices may include a hard disk, a random-access memory (RAM), an external storage medium, a memory device connected via a communication network, and a ledger within a CPU (Central Processing Unit).

BRIEF DESCRIPTION OF THE DRAWINGS

Embodiments of the invention will now be described, by way of example only, with reference to the accompanying drawings in which:

FIG. 3 and FIG. 4 illustrate example user interface displays.

DETAILED DESCRIPTION

Figure 1A:
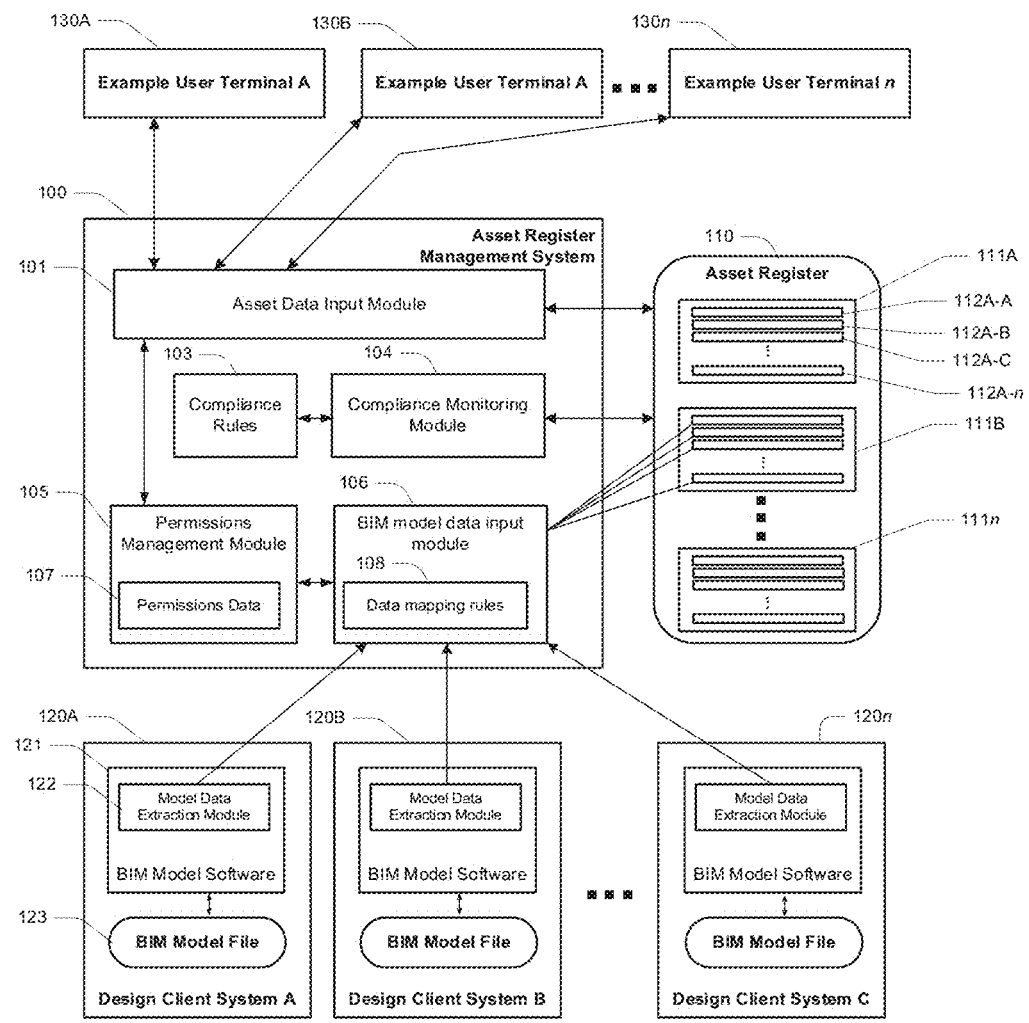
FIG. 1A illustrates a system according to one embodiment.

The present invention relates, in various embodiments, to technology for configuration of a digital twin for a building or other facility via BIM (Building Information Modelling) data extraction and asset register mapping. This is particularly relevant for the purposes of increasing efficiency and reducing risks of data errors in the context of configuring a digital twin interface for a building. Also described herein is technology configured to provide data flow management for defining of digital records representing building infrastructure based on building information modelling data. This is particularly relevant for the purposes of increasing efficiency and reducing risks of data errors in the context of configuring a digital twin interface for a building.

For the purposes of this description, the term "building" is used to generically describe a building or other facility that is designed and subsequently constructed. For example this may be a building, collection of buildings, hybrid indoor/outdoor space, sports stadium, outdoor space, and so on. A building is comprised of a plurality of "assets" defined in BIM model data for the building, based on a design phase whereby that BIM model data is generated. These assets include standard infrastructure assets (for example walls, floors, ceilings, etc.) and connected assets (for example sensors, controllers, IOT devices, cameras, access control devices, HVAC components, and so on).

The term "digital twin" or "digital twin interface" describes a computer platform that provides a user, for example a person with a scope of responsibility in relation to an in-use (i.e. occupied and operational) building, allowing that user to view the building as a rendered 3D model, and from within that model identify and access various devices within the building (for example reading values from sensors, initiating control instructions, and so on). That is, a user is enabled to, via a viewer module, view and navigate a building via three dimensional renderings, which show both architectural features and building assets. Where those assets are connected assets (for example assets that are networked, for instance via an IOT or BACnet arrangement), data and/or control functions are made available via the digital twin interface. A digital twin is distinguished from a building management system in the sense that it provides a higher technology layer that allows a user to access functionalities that optionally include conventional BMS data, but also data and information from a wider range of sources, and do so via a common 3D navigation interface.

The technology described below is described by reference to a three-phase lifecycle for a building:
  A design phase. At this phase, the building is designed, via a process that includes the generation of BIM data.
  A construction phase. At this phase, the physical building is physically constructed, including installation (and, where relevant, connection) of assets defined in the BIM data.
  A utilisation phase. This generally described when the building is in-use, for example when it is occupied by tenants.

It will be appreciated that these phases are not always temporally distinct, and may have some overlap.

Some embodiments relate to technology which overcome technical challenges in progressing valuable data from the design phase through to the utilisation phase, particularly in the context of generating and implementing a digital twin for the building. It will be appreciated that, during the construction and completion phase of a building, there can be a large number of people working on various aspects of asset installation and commissioning, leading to a significant amount of complexity and error susceptibility in terms of understanding the actual links between a designed building in a data file and a completed building in the real world.

One embodiment provides a method for configuration of a digital twin for a building. The method includes identifying one or more BIM model files for the building, which are prepared during the design phase, and subsequently completed and approved via a central validation process. Each of the BIM model files includes data sets representative of respective physical networked assets that are to be installed in the building. Each of the data sets has a unique identifier (UID), defined by a software program that is used to generate the model file. An example of known software which is used in a design phase for creation of BIM model data is Autodesk Revit (hereon "Revit"), and the technology is described by reference to that software.

The method includes two separate parallel processes: an asset register generation process, and a digital twin generation process.

The asset register generation process includes extracting the data sets from the one or more BIM model files thereby to populate an asset register. This causes the asset register to maintain an asset record for each of the networked physical assets proposed for the designed building. Each asset records includes the respective UID from the BIM model file. The asset register generation process also includes providing an interface that enables updating of the asset register during construction of the building and physical installation/configuration of the networked physical assets. Importantly, each of the asset records upon completion includes a data field populated to contain information that enables access to data and/or a control interface for the represented physical networked asset. Technology and methods supporting the asset register generation phase according to embodiments is described in detail further below.

The digital twin generation process includes performing a conversion of at least subset of the one or more BIM model files for the building thereby to define one or more visualisation files for the building. For example, this includes an Autodesk Revit to AutoCad conversion process, and then a manual process by which 3D visualisations are prepared in AutoCaD, these being suitable for navigation via a 3D visualisation interface.

The visualisation files are configured to be rendered via a 3D navigation interface, in the form of a digital twin interface, presented at a client terminal thereby to enable a user of that client terminal to navigate and view a 3D visualisation of the building. These files additionally include data points that are positioned at locations in the 3D visualisation associated with the networked physical assets, and respectively configured to cause displaying of obtained data based on the respective UID from the BIM model file.

During execution of the digital twin interface, a data mapping module is configured to facilitate the displaying of the obtained data. This includes: (i) identifying an asset UID provided from the visualisation file; (ii) determining, from the asset register, the value for the data field populated to contain information that enables access to data and/or a control interface for the represented physical networked asset; and (iii) causing mapping of data and/or control interface for the represented physical networked asset to the 3D navigation interface. In this manner, data is automatically mapped from the physical networked assets to the 3D visualisation interface.

In some embodiments the data field populated to contain information that enables access to data and/or a control interface for the represented physical networked assets includes a BACnet identifier (or BACnet address) defined in respect of a BACnet that is configured for the building. The data field may also be populated with information such as a non-BACnet network location and/or hyperlink.

Example System

FIG. 1A illustrates a technology framework including an asset register management system 100. System 100 is configured to enable workflow management in building construction, including workflow management for the configuration of data in an asset register 110 based on data defined in BIM model files during the design phase.

Asset register 110 is a database (or collection of databases) configured to maintain a plurality of asset records (111A to 111n) associated with a common building project. In some embodiments, asset register 110 maintains asset records for a plurality of building projects, with all asset records having identifiers associating them with a particular one of those building projects. Asset records are created to each represent, in data form, a physical asset, which is represented in BIM data during the design phase and physically installed as a physical asset during the construction phase. For example, the assets include standard infrastructure assets (for example walls, floors, ceilings, etc) and connected assets (for example sensors, controllers, IOT devices, cameras, access control devices, HVAC components, and so on).

Each asset record has a plurality of associated data fields, for example asset record 111A as data fields 112A-A to 112A-n. The number of data fields (and meaning of the individual data fields) is dependent on a given attribute of the asset, for the present example being the asset type. Asset register 110 is configured such that each asset record is configured to contain a predefined set of data fields associated with that asset type that are able to be populated with respective data values. In a preferred embodiment the set of data fields for a given asset type is determined by reference to a COBie specification for that asset type. Each asset record additionally includes a global unique identifier (GUID) which is unique in asset register 112.

System 100 includes a permissions management module 105. The permissions management module is configured to maintain permissions data 107 respective of access permissions for a plurality of users. For example, data 107 associates user login credentials with user permissions (for example permissions based on a user's defined scope-of-responsibility, or SOR). Permissions may be tied to asset record attributes, such as an asset type and/or asset system and/or an asset discipline. This assists in SOR-based permission setting—for example a given user is given access only to HVAC system assets. This may be access in terms of creating new asset records and/or modifying existing asset records, as discussed in more detail further below.

A BIM model data input module 106 is configured to manage the generation of new asset records from BIM model data. In overview, module 106 is configured to enable automated mapping of BIM data for a building project, stored in a plurality of distinct BIM model files (e.g. Revit files), into asset register 110. This would conventionally require an error prone and time-consuming manual process.

An example of known software which is used in a design phase for creation of BIM model data is Autodesk Revit (hereon "Revit"), and the technology is described by reference to that software. Some embodiments of the disclosed technology assists in overcoming technical problems associated with managing asset installation for a building where a plurality of parties are each individually responsible for installations within their own SOR and based on their own Revit files. Embodiments also find application in overcoming technical challenges associated with generation of a digital twin interface for a building from Revit data files. However it should be appreciated that the technology may be used with other software packages, which may also give rise to corresponding technical challenges.

In some embodiments, module 106 is configured to enable automated mapping of BIM data for a building project, stored in a plurality of distinct BIM model files (e.g. Revit files), into asset register 110. This would conventionally require an error prone and time-consuming manual process.

As context, for a given building project, a plurality of users generate respective BIM model files for the building, for example based on their individual SOR (e.g. architectural, plumbing, electrical, HVAC, and so on). In the present embodiment, the BIM model generating users are instructed to follow a predefined metadata attribute assignment protocol for assets included in their respective models. This is preferably performed when adding assets to the file, but may be performed at a later stage as a separate metadata management process. The predefined metadata attribute assignment protocol is matched to a data extraction script described further below. In one embodiment, the predefined metadata attribute assignment protocol sets the following minimum metadata requirements for each asset in a BIM model file:

| Asset Parameter | Comments |
| --- | --- |
| PROJECTID.Name | Named in line with equipment type protocol (COBie) |
| PROJECTID.Category | Asset Discipline group that the item belongs to i.e. Mechanical/Hydraulic |
| PROJECTID.AssetIdentifier | Specification number (COBie) |
| PROJECTID.Location | Named as space.name or Level.Room 01.01 room 1 on level 1 |
| PROJECTID.Type | Named in accordance with a predefined equipment type protocol |
| PROJECTID.System | E.g. Chilled Water flow. Name of System as per the system naming protocol. System optionally adheres to a parent-child naming convention, or other convention. |

In each case, the "PROJECTID" component is a unique identifier for a given building project (for example the PROJECTID component may be derived from a building name or address).

In practice, prior to completion of the design phase, all BIM model data files for the building project are collected centrally and cross-validated, thereby to ensure that they are compatible for construction purposes. This also allows for a preliminary asset count that defines a number of assets for the project that should be expected in the asset register. The cross-validation process also preferably includes ensuring all data files comply with the metadata attribute assignment protocol described above.

FIG. 1A illustrates example design client systems 120A to 120n. Each of these systems is a computer system that executes BIM model software 121 (for example Revit) and has access to a respective BIM model file 123 (which is typically local stored). A model data extraction module 122 executes as a plugin within the software environment of software 122 (for example as a Revit plugin), which is configured to execute various processes from within that environment.

Figure 2A:
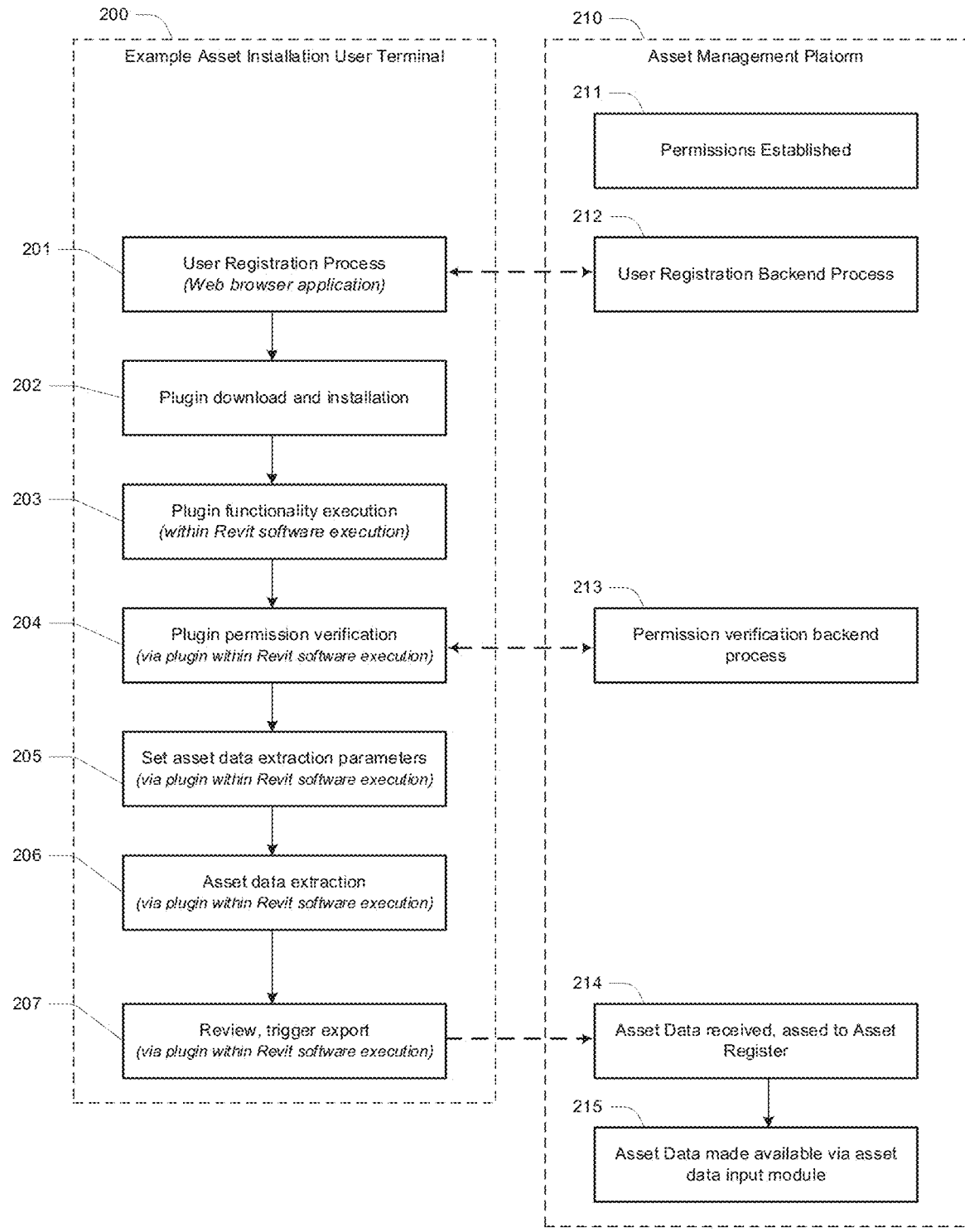
FIG. 2A and FIG. 2B illustrate methods according to embodiments.

BIM model data input module 106 is configured to communicate with a plurality of instances of the model data extraction module 122, as these execute at respective remote client systems. An operator of a given one of the systems 120A to 120n triggers execution of a model data extraction process (for example via accessing a function associated with the plugin). A process associated with asset extraction module 122 is shown in FIG. 2A. This is illustrated by references to a set of processes 200 performed on an example user terminal (for example system 120A), and a set of processes 210 performed by an asset register management system (such as system 100).

Block 211 represents a process including establishing permissions for a plurality of users, based on known scope of responsibility attributes for those users. For example, a set of contractors each associated with the construction phase of a building are identified, and identifying details inputted into a permissions data store maintained by the asset management system. Block 201 represents a process whereby a user accesses a registration interface for the asset management system (for example vis a user interface hosted by a web server and rendered in a user terminal web browser application), and completes a registration process (for example setting/confirming login credentials and so on). In some embodiments process 211 includes inputting of user email addresses, and triggers automated delivery of emails having registration hyperlinks; process 201 is triggered via clicking of such hyperlinks. Block 202 represents a backend process whereby user registration is completed.

Block 202 represents a process by which asset extraction module 112 is downloaded and installed, in this embodiment by way of downloading and installing a Revit plugin. Functionality provided by this plugin is accessible from a plugin specific tab that is subsequently displayed within the Revit software platform. A user accesses that tab at process 203, which causes execution of computer code associated with the plugin.

Block 204 represents a process whereby the plugin performs a permission verification process, which prompts the user to input login credentials corresponding to those defined at block 201. These are uploaded to the asset management system thereby to enable a permission verification backend process 213 via permissions module 105 and permissions data 107. In this manner, the model data extraction module is selectively granted access to transmit data to the BIM data input module, based on a user verification and permission determination process performed by the permissions management module.

Block 205 represents an optional process including setting of asset metadata attributes to filter asset metadata for extraction form the Revit file. This optionally includes automated setting of primary attributes based on user scope of responsibility as determined from the processes of blocks 204 and 213 (preferably based on PROJECT.Type attribute). It optionally includes additional filtering at the discretion of an operator, for example to further limit assets that are of relevance to the operator (for example based on asset location, and so on). In some cases all assets defined in each BIM model data file are extracted without filtering.

Block 206 represents a process including execution of a script defined for the plugin that causes analysis of Revit file 102, thereby to query assets in the model having metadata conforming to the predefined metadata attribute assignment protocol, as described above, based on extraction parameters defined at block 205. That is, the model data extraction module performs a data analysis process in respect of a defined BIM model file thereby to extract a plurality of data sets complying with a predefined metadata schema; The data is then optionally presented for review by the operator at 207, optionally allowing for operator editing of the metadata (with such modifications being implemented in the Revit fie), and the operator provides an instruction to export the data to the asset management system.

The model data extraction module causes transmission of the extracted data sets to the BIM data input module Block 214 represents a process whereby the asset data extracted from the Revit file at 207 is received, and added to a cloud-hosted asset register. As represented by block 217, this allows the data to be accessed via an asset data input module, as discussed further below.

For each of the extracted data sets, the BIM data input module:

(i) Determines an asset type;
(ii) Creates a new asset record in the asset register database having predefined set of data fields associated with that asset type, and a GUID defined by data extracted from the BIM model file; and
(iii) Pre-populates a subset of those data fields based on the predefined metadata schema. For example, a "PROJECT.location" value in the model file extracted metadata is used to automatically populate a "location" field in the asset register record for the relevant asset.

This is performed such that the BIM data input module creates new asset records in the asset register database, for a common building project, based on data contained in a plurality of discrete BIM model files maintained on respective host systems. In effect, asset data defined across a plurality of files by a plurality of collaborating users is extracted directly from the source files into specified locations in the asset register such that the asset register defines records for all assets defined in the model files. Furthermore, given that each asset record has a predefined set of data fields associated with the relevant asset type, the asset register includes both values pre-populated via the BIM model file extraction process, and data fields that are to be completed during the construction phase, as discussed below.

As noted, in a preferred embodiment the set of data fields for a given asset type is determined by reference to a COBie specification for that asset type. By way of example, data fields may include those able to be populated directly from a BIM model based on the technology described above (and metadata assignment schema for assets in BIM model files), and additionally a plurality of fields to be completed during the construction phase. These optionally, include, by way of example:

One or more data fields representative of a state of asset installation.
One or more data fields representative of a state of asset commissioning.
One or more data fields representative of a state of asset testing. For example, this may include, in the case of a HVAC component, air flow measurements and the like.
A device network address (or other information allowing connection to the asset over a network). That is, for at least a subset of the asset types, the predefined set of data fields include a field that is designated to be populated with a data value that enables accessing of live asset data from a physical networked device that physically embodies a specific asset represented by a given asset record. This may include enables identification of the physical device on a BACnet network, and is optionally used to provide mapping of live asset data from a physical asset to a digital twin interface.

The data fields also include a global unique identifier (GUID). The GUID may defined by a software application used to generate the BIM model file (for example when defining assets in Revit, the software application inherently assigns a UID to each asset). In a preferred embodiment the GUID is a hybrid between an asset identifier defined by a software application used to generate the BIM model file and an asset name data value (which is preferably defined by reference to asset type and location). A data validation module is configured to validate that each asset has an asset register GUID that is unique in the asset register database.

System 100 includes an asset data input module 101 which is configured to provide access to the cloud-hosted asset register 110 that is populated with partially completed asset records (for example records partially completed based on operation of input module 106).

Asset data input module 101 is configured to enable a user of a remote client terminal (for example terminal 130A-130n, which represent computing devices that download from a web server computer executable code thereby to enable rendering in a browser application a user interface with which to interact with system 100) to add data values to data fields for a subset of the records in the asset register. This subset is defined based on permissions maintained by the permissions management module, which define scope of responsibility for each user. For example, a user's permissions are tied to one or more asset field values including category, location, type and system. This allows for tailored scope of responsibility assignment. An example interface is illustrated in FIG. 3. FIG. 3 provides an example user interface component rendering from an asset editor module 113 according to one embodiment, showing assets of type "Air Handling Unit" belonging to the category "Mechanical".

Figure 2B:
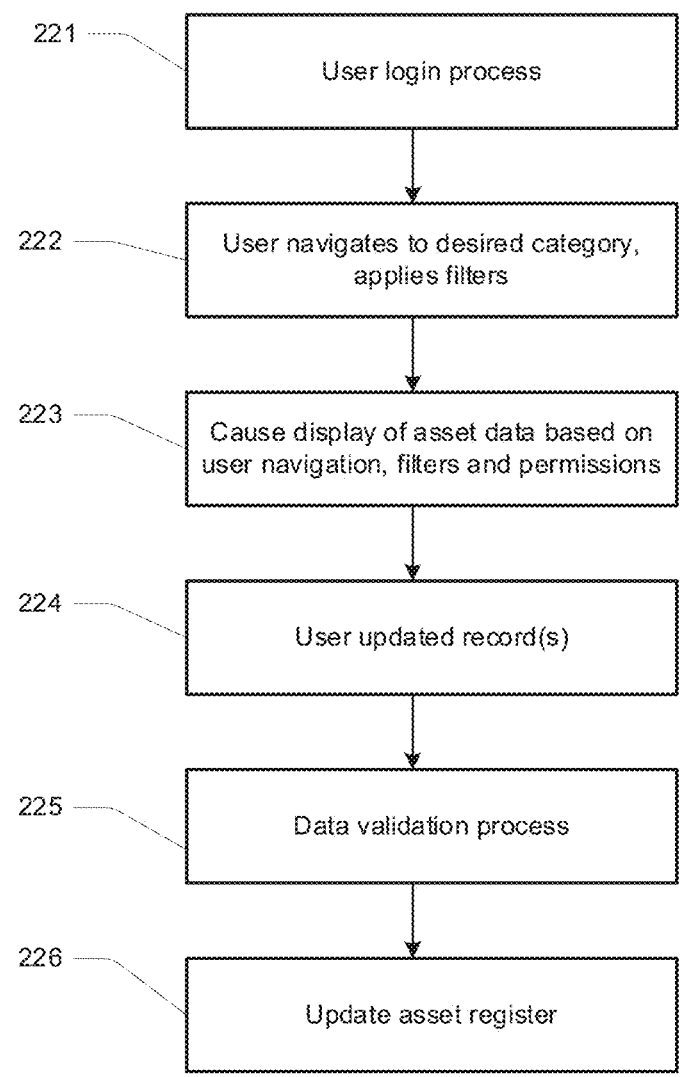

FIG. 2B illustrates a method performed by the asset editor module 113.

Block 221 represents a user login process, which if completed successfully (i.e. the user provides credentials which are successfully validated) provides the user with access to user interface components that enable navigation (block 222) to an asset register display based on a desired asset category selection, and optionally one or more user-inputted filters. Block 223 represents a process including an asset register search, and causing display of asset data via the user interface based on the user's navigation (and optional filters), and additionally based on filtering performed based on the user's scope of responsibility based permissions.

Block 224 represents a process by which a user updates one or more asset records. This is able to be performed via the user interface, or in some embodiments via data export to a local file (e.g. a CSV file) which is edited on a local machine, and subsequently uploaded to import updates. Block 225 represents a data validation process by which module 113 interacts with an asset compliance rules module, which maintains a set of rules (i.e. data requirements) to be satisfied, thereby to determine whether the data is suitable for pushing to the asset register (block 226). Where issues are identified, the user is prompted to rectify those.

System 100 also provides functionality for monitoring asset installation for a building project based on level of asset data completion as reflected in the asset register. In this regard, a compliance rules module 103 is configured to maintain, for each asset type, one or more rules for determining a record completion compliance measure. This rules module operates in conjunction with a compliance monitoring module that is configured to, responsive to the rules module, determine and enable output of data representative of record completion compliance measures for the asset records in the asset register database.

Figure 4:
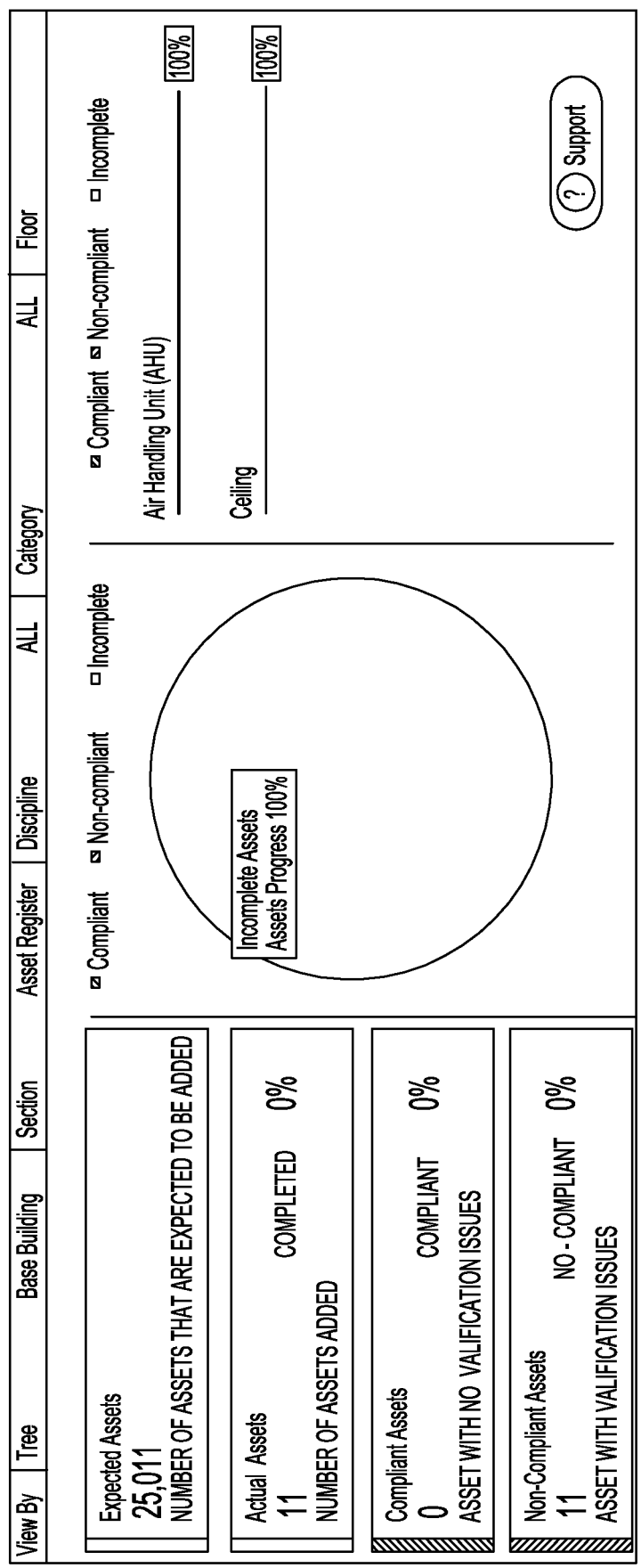

FIG. 4 illustrates a dashboard that provides a user, for example a system administrator or head contractor, with data generated by the compliance monitoring module (for example via a web page interface), thereby to deliver situational awareness over progress in terms of assets being added to the asset register. In this diagram, the information displayed includes:

Number of expected assets, based on BIM data.
Number of compliant assets (i.e. assets added to the data register which satisfy the rules implemented by module 114).
Number of non-compliant assets (i.e. assets added to the data register which fail to satisfy the rules implemented by module 114).

This allows for convenient visual tracking of progress in an asset upload process against key project milestones and the like.

Example Process Flow

Figure 5:
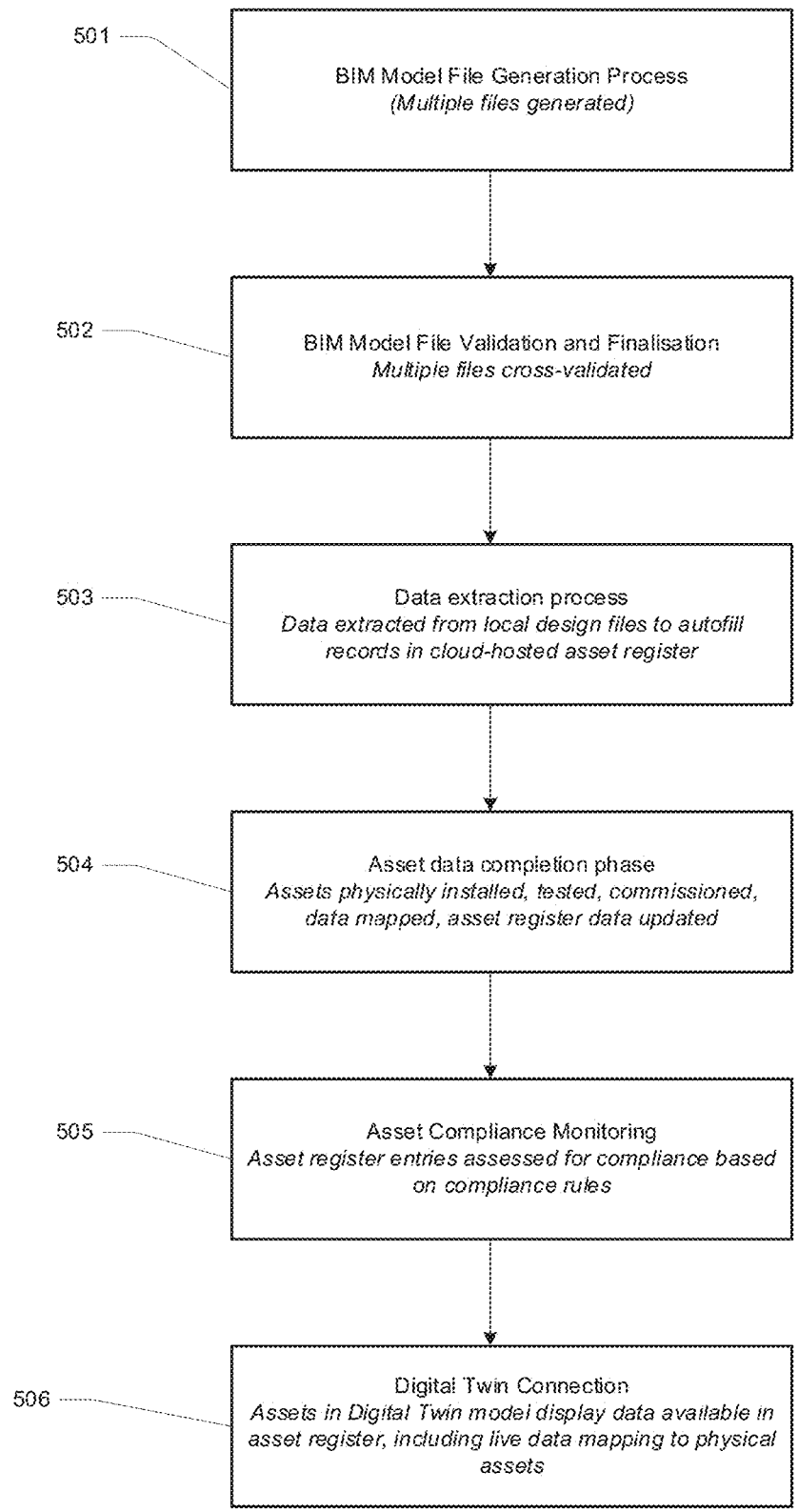
FIG. 5 illustrates a method according to one embodiment

FIG. 5 provides an example process flow according to one embodiment, which is at least in part implemented by the system of FIG. 1A.

Block 501 represents a process whereby multiple parties collaborate on a building design project, which results in generation of a plurality of individual BIM model files (e.g. Revit files) for the project. At block 502, the files are cross-validated and finalised (which includes verifying that assets defined in the files make use of a predefined metadata assignment schema).

Block 503 represents a data extraction process whereby each of the design collaborating parties operate a software plugin (for example an Autodesk Revit plugin) which is configured to cause extraction of asset data from the relevant Revit file and push that data to a server where it is applied to generate new asset records in an asset register database, pre-fill those records with data extracted from the Revit file, and create data fields additional for later completion based on a determined asset type (and/or based on other attributes), for example based on a COBie specification.

Block 504 represents an asset data completion phase, whereby during building construction a plurality of users gain access to update asset records in the asset register (via SOR-based permissions) thereby to complete other required data values. This includes physical installation, testing, commissioning and (where relevant) data mapping. Block 505 represents asset compliance monitoring, whereby the filling of asset data in the asset register is assessed against compliance rules.

Block 506 represents a digital twin connection process, whereby the asset register is used to create a mapping between graphical renderings for a building delivered via a digital twin interface to live data values (and optionally control interfaces) for networked assets, for example assets on a BACnet and/or other IOT devices. This mapping is achieved based on updating of the asset register to include data that provides access to live data (and/or control interfaces), and additionally in some embodiments based on a common GUI available to both the asset register and in digital twin model data. This is discussed in more detail further below.

Digital Twin Generation

Figure 1B:
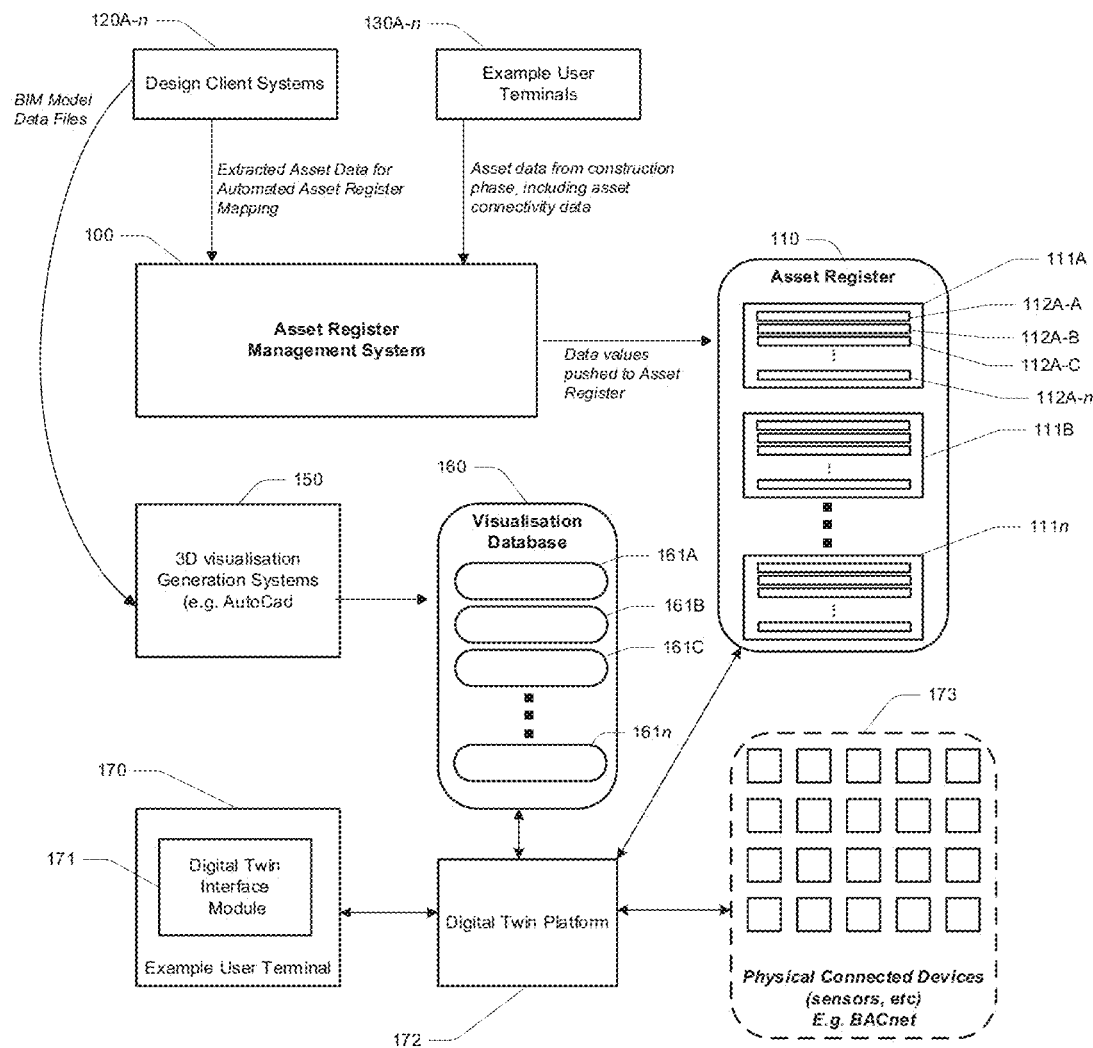
FIG. 1B illustrates a system according to one embodiment.

FIG. 1B illustrates a configuration according to one embodiment, which supports generation and viewing of a digital twin interface for a building or other facility via components which operate at various phases of the building lifecycle. Components from FIG. 1A are illustrated using corresponding reference numerals. However, it will be appreciated that technology of FIG. 1B is in some embodiments applied using components other than those described by reference to FIG. 1A.

FIG. 1B depicts an asset register generation process which makes use of: (i) a data extraction process thereby to extract preliminary asset data values from BIM model data (e.g. Revit files), along with an asset GUID derived from those extracted asset data values; and (ii) an input process by which asset records are updated to populate data fields (for example COBie specification data fields) during construction. The latter includes, for at least a subset of asset records, inputting of data thereby to enable accessing of a live data feed and/or control interface for a physical networked device described by the asset record. For example, this may be a BACnet ID which allows for identification of the asset on a BACnet network.

BIM model files (e.g. file 123) generated by system 120A-n are also provided to one or more 3D visualisation generation systems, for example computer systems operating a computer program product such as AutoCad. Revit files are converted into an AutoCad format via these systems, and one or more users manipulate the software thereby to generate visualisation files for a digital twin interface. These files 161A-161n are stored in a visualisation database 160. Each of these files includes locational markers associated with assets that are diagrammatically represented, these being marked using the same asset GUID used for the purposes of asset register 110.

A digital twin platform 172 is configured to make files in database 160 available to user terminals, such as an example user terminal 171, which executes a digital twin interface module 171. Digital twin interface module is configured to enable rendering and user-controlled 3D navigation of 3D visualisation modules generated by system 150 and stored in database 160, and allow display of asset data for assets that are rendered in a display window of the client terminal.

The display of asset data is facilitated by communications between digital twin platform 172 and asset register 110. In particular, by accessing asset register 110 and submitting a query containing a given asset GUID known from the visualisation data file, platform 172 is able to obtain data required to enable accessing of a live data feed and/or control interface (for example via a BACnet), and beacon that data cause the live data feed and/or a rendering of the control interface to be procured from a relevant physical device 173 and displayed at terminal 170.

Figure 6:
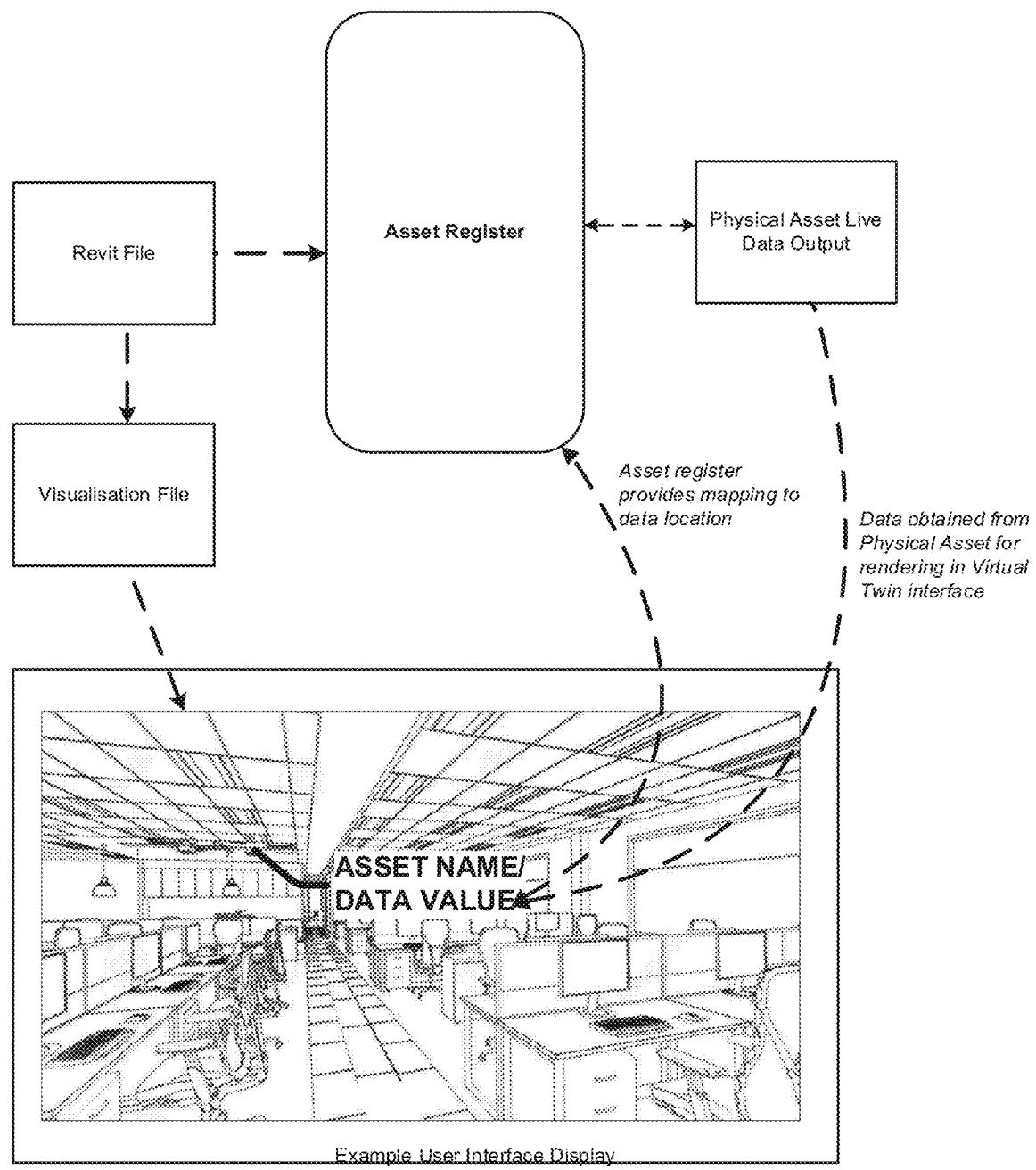
FIG. 6 illustrates a data flow arrangement according to one embodiment.

This mapping of data visualisations to physical assets is also illustrated in FIG. 6. A Revit file from building design is able to form a basis to commence two entirely separate processes: (i) population of an asset register for a physically constructed building with operational connected devices; and (ii) generation of visualisations for rendering in a digital twin interface. By way of the technology described herein, which uses a common asset GUID process as a basis for both of these discreet and separate processes, a digital twin interface is able to be functionally connected to live data and/or control interfaces from physical assets without need for a separate digital twin asset configuration process.

It will be appreciated that this approach to digital twin generation provides substantial technical advantages over prior art approaches, particularly in the sense that mapping of data between physical devices and the digital twin interfaces is essentially automated by virtue of a separate asset register generation and compliance process, which is of separate utility in the context of monitoring building completion progress.

Figure 7:
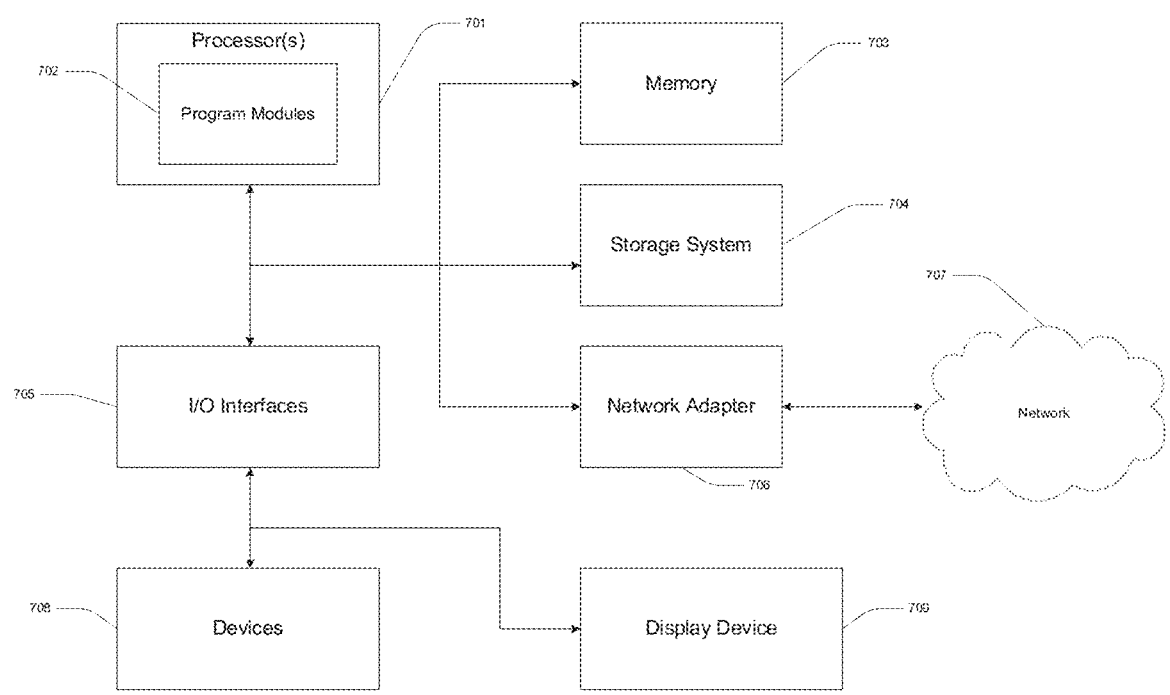
FIG. 7 illustrates an example computer system.

FIG. 7 illustrates a schematic of an example computer or processing system that may implement any portion systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 701, a system memory 703, and a bus 705 that couples various system components including system memory 706 to processor 701. The processor 701 may include a software module 702 that performs the methods described herein. The module 701 may be programmed into the integrated circuits of the processor 701, or loaded from memory 703, storage device 704, or network 707 or combinations thereof.

Bus 705 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 703 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 705 by one or more data media interfaces.

Computer system may also communicate with one or more external devices 708 such as a keyboard, a pointing device, a display 709, etc.; one or more devices that enable a user to interact with computer system; and/or any devices (e.g., network card, modem, etc.) that enable computer system to communicate with one or more other computing devices. Such communication can occur via Input/Output (I/O) interfaces 709.

Still yet, computer system can communicate with one or more networks 707 such as a local area network (LAN), a general wide area network (WAN), and/or a public network (e.g., the Internet) via network adapter 706. As depicted, network adapter 706 communicates with the other components of computer system via bus 705. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the users computer, partly on the users computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method for configuring data mapping for a digital twin interface which represents a specific physically constructed building, the method including:
(i) accessing data representative of an architectural design file for the building;
(ii) extracting data from the architectural design file accessed at (i) thereby to generate a set of new records in an asset register, wherein each new record is configured to contain data representing an asset in the form of a physical networked device represented in the architectural design file, wherein each new record includes: a device unique identifier (UID) field which is populated based on data extracted from the architectural design file; and a network addressing field which and configured to contain physical network addressing information which is unpopulated in the new record and remains unpopulated until a physical commissioning process is performed based on a commissioning process at (vi) below;
(iii) processing the architectural design files thereby to generate digital twin three-dimensional representation data, wherein the digital twin three-dimensional representation data is configured to be rendered via a display object in a digital twin user interface system;
(iv) based on data extracted from the architectural design files accessed at (i), defining points at specific positional locations in the digital twin three-dimensional representation data which are respectively associated with locations of physical networked devices represented in the architectural design files accessed at (i), and for each point assigning an identification value including the device UID extracted from the architectural design file in respect of the physical networked device with which it is associated, wherein each point is configured to enable display of device specific data values when rendered in the digital twin user interface system;
(v) configuring a data mapping component for the digital twin user interface system which enables the digital twin user interface system to access live data values for each of the points via the asset register by (A) identifying in the asset register a record containing the UID assigned to that point via the identification value; and (B) accessing live data values from physical networked infrastructure using the physical network addressing information in that record's network addressing field in the event that the network addressing field is populated to configured to contain physical network addressing information;
(vi) independently of the performance of (iii) to (v), publishing the asset register derived from the architectural design file accessed at (i) to a cloud-hosted location accessible by a plurality of distinct networked user terminals, wherein each terminal provides a device commissioning interface that enables populating of fields for records in the asset register by users physically interacting with infrastructure of the building during physical installation/configuration of the physical networked devices, thereby to enable population of the physical network addressing information in the network addressing fields of records of the asset register;
such that the asset register derived from the architectural design file accessed at (i) provides a link between the digital twin three-dimensional representation data and the device commissioning interface, thereby enabling independent performance of digital twin configuration at (iii) to (v) and physical networked device commissioning at (vi).

2. A method according to claim 1 wherein the network addressing field is configured to contain information that enables access to data and/or a control interface for the represented physical networked devices, including a BACnet identifier defined in respect of a BACnet that is configured for the building.

3. A method according to claim 1 wherein the network addressing field is populated to contain information that enables access to data and/or a control interface for the represented physical networked devices, including one of: a BACnet address; a network location; or a hyperlink.

4. A method according to claim 1 wherein (iii) includes operating a BIM model data input module, wherein the BIM model data input module is configured to communicate with a plurality of instances of a model data extraction module that executes at respective remote client systems, wherein:
an operator of a given one of the remote client systems triggers execution of the model data extraction model;
the model data extraction module is selectively granted access to transmit data to the BIM model data input module, based on a user verification and permission determination process; and
the model data extraction module performs a data analysis process in respect of a defined BIM model file thereby to extract a plurality of data sets complying with a predefined metadata schema;
the model data extraction module causes transmission of extracted data sets to the BIM model data input module; and
for each of the extracted data sets, the BIM model data input module determines an asset type, creates a new asset record in the asset register having predefined set of data fields associated with that asset type, and pre-populates a subset of those data fields with data values in the extracted data set based on a predefined metadata schema.

5. A method according to claim 1 wherein (vi) includes operating an asset data input module that is configured to enable a user of a remote client terminal, responsive to permissions maintained by the permissions management module, to add data values to data fields for a controlled subset of the records in the asset register database.

6. A method according to claim 1 wherein the architectural design file includes one or more Autodesk Revit files, and wherein (iii) includes performing a conversion from Autodesk Revit into AutoCad, and performing editing of a visualisation file using AutoCad.

7. A method according to claim 1 including performing a scope-of-responsibility permissions assessment thereby to determine, for a given user of the 3D visualisation interface, a subset of assets defined in the asset register that the user is permitted to access.

8. A method according to claim 1 wherein (i) includes defining each new record to include unpopulated fields for a given asset type for each physical networked device, wherein in each instance, a specific set of unpopulated data fields for the record is selected, responsive to the type of physical networked device, based upon a COBie protocol.

9. A method according to claim 1 including:
(vii) providing a compliance monitoring module configured to monitor asset installation for a building project based on population of data fields in the asset register, wherein a rules compliance module is configured to implement, for each device type defined in the asset register, one or more rules for determining a record completion compliance measure, such that the compliance monitoring module is configured to, responsive to the rules compliance module, determine and enable output of data representative of record completion compliance measures for the records in the asset register, thereby to provide an indication of progress towards completion of commissioning of physical networked devices.

10. A method according to claim 9 wherein the compliance monitoring module enables rendering of a dashboard that provides a user with data generated by the compliance monitoring module, including: a number of expected assets, based on data extracted from the architectural design file; number of compliant assets which satisfy the rules implemented by the rules compliance rules module; and number of non-compliant assets which fail to satisfy the rules implemented by the rules compliance module.

* * * * *